United States Patent [19]

Kobashi et al.

[11] 4,036,803
[45] July 19, 1977

[54] PROCESS FOR PRODUCING FLAME RETARDANT ACRYLIC SYNTHETIC FIBERS

[75] Inventors: Toshiyuki Kobashi; Kenichi Masuhara, both of Okayama, Japan

[73] Assignee: Japan Exlan Company Limited, Osaka, Japan

[21] Appl. No.: 630,890

[22] Filed: Nov. 11, 1975

[30] Foreign Application Priority Data

Nov. 14, 1974 Japan .................................. 49-131832

[51] Int. Cl.² .............................................. C08L 33/20
[52] U.S. Cl. ................... 260/29.6 AN; 260/29.6 PM; 260/29.6 RW; 260/29.6 SQ; 260/898; 264/182
[58] Field of Search ................ 264/182; 260/29.6 AB, 260/29.6 AQ, 29.6 AN, 29.6 SQ, 29.6 PM, 898, 29.6 RW

[56] References Cited

U.S. PATENT DOCUMENTS

| 3,051,545 | 8/1962 | Steuber ................................. 264/182 |
| 3,963,790 | 6/1976 | Couchoud ............................ 264/182 |

FOREIGN PATENT DOCUMENTS

| 47-606 | 1/1972 | Japan ................................... 264/182 |

*Primary Examiner*—Jay H. Woo
*Attorney, Agent, or Firm*—Wenderoth, Lind & Ponack

[57] ABSTRACT

In a process for the production of flame retardant acrylic synthetic fibers by mixing a spinning solution of a acrylonitrile polymer with an emulsion of a polymer of a vinyl halide and/or vinylidene halide, and wet-spinning the resulting mixed solution, the improvement which comprises using, as said emulsion, an emulsion obtained by polymerizing a vinyl halide and/or vinylidene halide in an aqueous medium in the presence of certain water-soluble polymer.

9 Claims, No Drawings

PROCESS FOR PRODUCING FLAME RETARDANT ACRYLIC SYNTHETIC FIBERS

The present invention relates to an improved process for the production of a flame retardant acrylic synthetic fiber. More particularly, the invention is concerned with a process for the production of a flame retardant acrylic synthetic fiber by mixing a spinning solution composed of an inorganic solvent solution of an acrylonitrile polymer with an emulsion of a polymer of a vinyl halide and/or vinylidene halide (which shall be briefly called a halogen-containing polymer hereinafter), and wet-spinning the resulting mixed solution, characterized by using as said emulsion a halogen-containing polymer emulsion which is obtained by a specific polymerization process not using an ordinary emulsifier and which is very stable chemically and mechanically and which contains extremely fine polymer particles, thereby obtaining an acrylic synthetic fiber having excellent flame retardancy and transparency without causing aggregation of the halogen-containing polymer particles, stably in operation and in an industrially advantageous manner.

Fibers produced from the ordinary acrylonitrile polymers have found a wide variety of applications in the field of textile and interior decoration. However, since these fibers are essentially lacking in flame retardancy, it is not desirable to use them in special uses, for example interior decorations such as carpets, curtains, etc. and clothing for babies and children.

Thus, in order to overcome this defect of acrylic synthetic fibers, there have been heretofore proposed a number of methods, such as a method wherein acrylonitrile is copolymerized with a flame retardant monomer copolymerizable therewith, a method wherein a flame retardant polymer is blend-spun with acrylonitrile homopolymer or copolymer, a method wherein a spinning solution containing a flame retardant kneaded thereinto is spun, a method wherein the fiber is post-treated with a flame retardant, etc.

A more concrete technique of such flame retardant methods comprises spinning a spinning solution of an acrylic polymer containing powder of a halogen-containing polymer such as polyvinyl chloride, polyvinylidene chloride, etc. which has been kneaded into the solution.

In the conventional method of kneading powder, such as polyvinyl chloride powder, into an acrylic polymer solution, it has been generally the practice to introduce the powder into the spinning solution after it has been pulverized by a grinder such as a colloid mill. But by such conventional methods, it is very difficult to obtain a spinning solution containing polyvinyl chloride dispersed uniformly. Also, the polyvinyl chloride particles have a strong tendency of aggregating each other to form masses, thereby causing various difficulties such as clogging of spinnerette and filament breaking upon stretching. Therefore, such is a serious problem in industrial practice.

In addition, halogen-containing polymers such as polyvinyl chloride and polyvinylidene chloride are generally obtained by emulsion polymerization. The separation of the polymer, the resulting product of the emulsion polymerization, from the emulsion is extremely difficult in comparison with the case of the polymer obtained by aqueous suspension polymerization, because of extremely fine particles of the polymer and the existence of an emulsifier in the emulsion system. Such additional operation of separation is disadvantageous in industrial productivity.

Accordingly, if a halogen-containing polymer emulsion obtained by emulsion polymerization can be directly introduced into an acrylic spinning solution without separating the polymer from the emulsion, the operation of separating the polymer can be omitted, which will result in a great improvement in industrial productivity.

However, as suggested in Japanese Patent Publication No. 35974/1971, the halogen-containing polymer emulsion obtained by emulsion polymerization causes aggregation to form particle aggregates or secondary particles in an acrylic spinning solution using an inorganic solvent for the acrylonitrile polymer. Accordingly, when the emulsion is mixed and dispersed in the spinning solution, it is impossible to obtain a sufficently uniform dispersion. Therefore, clogging of spinnerettes, filament breaking upon stretching, etc. will occur frequently to make it difficult to use such a spinning solution for industrial purposes. Redispersion of the particle aggregates or secondary particles by mechanical means is also entirely unsuccessful and impracticable. Also, since halogen-containing polymer emulsions obtained by the ordinary emulsion polymerization process contains an emulsifier in a small amount, foam is generated in the preparation step of the spinning solution or in the spinning step. This makes difficult to obtain acrylic fibers stably in operation, and in some cases the addition of a defoaming agent is unavoidable.

In the light of such circumstances, we made a study to remove these defects caused upon introducing a halogen-containing polymer emulsion into an inorganic solvent solution of an acrylonitrile polymer. As a result, it has been found that, by using a halogen-containing polymer emulsion having very fine polymeric particles and being chemically and mechanically stable, obtained by a special emulsion polymerization process in which an usual emulsifier is not used but a water-soluble polymer having a specific composition is used instead, the halogen-containing polymer emulsion can be mixed in the acrylonitrile polymer spinning solution finely and uniformly, and thus the difficulties in operation such as the foaming in the preparation step of the spinning solution and in the spinning step can be eliminated advantageously.

The main object of the present invention is to provide a process for producing a flame retardant acrylic synthetic fiber in an industrially advantageous manner.

An object of the invention is to produce an acrylic synthetic fiber having excellent flame retardancy and transparency, without causing aggregation and foaming, and stably in operation, by introducing into a spinning solution of an acrylonitrile polymer a halogen-containing polymer emulsion obtained by a special emulsion polymerization process.

Other objects of the invention will become apparent from the following concrete explanation of the invention.

Such objects of the present invention, wherein a flame retardant acrylic synthetic fiber is produced by mixing a spinning solution composed of an inorganic solvent solution of a acrylonitrile polymer with an emulsion of a polymer of a vinyl halide and/or vinylidene halide and wet-spinning the resulting mixed solution, can be achieved by using as said emulsion an emulsion obtained by polymerizing a vinyl halide and/or vinylidene halide, if necessary plus other unsaturated monomers copolymerizable therewith, in an aqueous medium of a pH below 4 using a water-soluble catalyst, in the presence of a water-soluble polymer containing, combined therewith, monomer units consisting essentially of an ethylenically unsaturated carboxylic acid or a salt thereof and monomer units consisting of an ethylenically unsaturated sulfonic acid or a salt thereof.

Since the halogen-containing polymer without being separated from the emulsion can be directly mixed with the acrylic spinning solution uniformly, it has become possible to produce flame retardant acrylic synthetic fibers in an industrially advantageous manner. The halogen-containing polymer emulsion obtained by the specific emulsion polymerization process contains extremely fine polymeric particles as compared with polymer emulsions obtained by the ordinary emulsion polymerization process, and in addition it is very stable chemically and mechanically. Therefore, without formation of masses of aggregated particles of the halogen containing polymer, it is now possible to produce a spinning solution in which the halogen-containing polymer particles are dispersed finely and uniformly, thus advantageously eliminating clogging of filters and spinnerettes which may become very serious defects in the fiber production step.

Moveover, since the halogen-containing polymer emulsion used in the present invention does not contain a generally used emulsifier as contrasted to polymer emulsions obtained by the ordinary emulsion polymerization process, it is possible to avoid effectively the foaming of the spinning solution in the preparation step and the foaming of the coagulating bath in the spinning step which occur in the conventional processes.

The acrylic synthetic fiber obtained according to the present invention has excellent transparency besides excellent flame retardancy. The following hypothesis may serve as an explanation for this phenomenon: Since the halogen-containing polymer has very fine particle diameter and the water-soluble polymer of the specific composition used instead of an emulsifier is considered to act as a protective colloid covering the surfaces of the halogen-containing polymer particles in the emulsion, the water-soluble polymer will be interposed between the acrylonitrile polymer and the halogen containing polymer having no mutual compatibility and fill up the space between the two during the ordinary heat treatment step.

The water-soluble polymers used in the present invention are polymers rendered water-soluble by making the polymer contain, as the polymer components combined with each other, monomer units consisting of an ethylenically unsaturated carboxylic acid or a salt thereof (A component) and monomer units consisting of en ethylenically unsaturated sulfonic acid or a salt thereof (B component). So far as the water-soluble polymers finally contain A and B components regardless of the procedure by which they have been produced, they can be used effectively for the present invention. However, they are generally produced by copolymerizing an A component and a B component by a known method (particularly suitable one is the solution polymerization process using water as the solvent). Of course, a method may be employed wherein a copolymer copolymerized with an unsaturated carboxylic acid ester, such an an acrylic acid ester, is hydrolized to form an A component in the polymer, or wherein a B component is introduced by the sulfonation of the polymer.

The proportion of an A component and a B component in such a water-soluble polymer is varied to a certain extend depending on the monomer(s) to be emulsion-polymerized, and thus it is difficult to limit it definitely. However, it is desirable that the proportion A/B fall within the range of 30–80 %/70–20 %. Also, the degree of polymerization of such a polymer is not particularly limited, but it appears that, within the practical range of molecular weight, the smaller the molecular weight, the finer the particle diameters of the polymer emulsion. Further, is some cases, depending upon the type of the monomer(s) to be emulsion-polymerized, a better emulsion can be obtained when using, as the water-soluble polymer, a water-soluble polymer which, in addition to an A component and a B component, has been copolymerized or graft-polymerized with a small amount of a hydrophobic monomer such as vinylidene chloride. Accordingly, such polymers are also included in the scope of the water-soluble polymers used in the present invention.

Among the A components which may be introduced into such water-soluble polymers may be mentioned: unsaturated monovalent carboxylic acids, such as acrylic acid, methacrylic acid, vinylacetic acid, crotonic acid, and salts (e.g. sodium, potassium, ammonium salts, etc.) thereof; and unsaturated polyvalent carboxylic acids, such as maleic acid, fumaric acid, itaconic acid, aconitic acid, citraconic acid, mesaconic acid, and salts (e.g. sodium, potassium, ammonium salts, etc.) thereof. However, from the viewpoint of emulsion stability and particle diameter of the emulsion, the introduction of monomer units composed of methacrylic acid or a salt thereof is particularly recommended.

Among the B components may be mentioned: sulfonated unsaturated hydrocarbons, such as sulfonated styrene, allylsulfonic acid, methallylsulfonic acid, and salts (e.g. sodium, potassium, ammonium salts, etc.) thereof; and sulfoalkyl esters of acrylic acid or methyacrylic acid, such as methacrylic acid sulfoethyl ester, methacrylic acid sulfopropyl ester, and salts (e.g. sodium, potassium, ammonium salts, etc.) thereof.

The production of the halogen-containing polymer emulsion in accordance with the present invention is carried out in the same way as in the conventional emulsion polymerization process except that a said water-soluble polymer is used in place of an emulsifier. Namely, a vinyl halide such as vinyl chloride, vinyl bromide, and/or a vinylidene halide such as vinylidene chloride, vinylidene bromide, if necessary plus another unsaturated monomer copolymerizable therewith, are fed to the polymerization system together with 0.5 – 10 weight percent, based on the monomer(s) used, of said water-soluble polymer and an amount of water in which a prescribed amount of water-soluble catalyst has been dissolved. After the addition of a chain transfer agent, etc. if required, with the pH of the system being maintained below 4 and at a prescribed temperature, the monomer(s) are polymerized in a batchwise or continuous method. In such polymerization, the polymerization pH is of particular importance, and for the attainment of the objects of the present invention, it is necessary to employ a polymerization pH below 4. If a pH above 4 is employed, the particle diameters of the resulting polymer become large, and there is a tendency for the emulsion to aggregate, and thus it is then difficult to prepare a stable polymer emulsion.

The above-mentioned other unsaturated monomers copolymerizable with vinyl halide and/or vinylidene halide may be introduced into the polymer in an amount of 0 – 25 % by weight. As for such monomers, any one which can be emulsion-polymerized may be used, e.g. those which are exemplified hereinafter as monomers to be copolymerized with acrylonitrile. But particularly, among them, the use of monomers having strong hydrophobic characteristics is preferred.

For the polymerization catalysts, any known radical generating water-soluble polymerization catalyst, such as persulfates, may be used. But particularly, the use of a redox-type catalyst composed of a combination of persulfate and a reducing sulfoxy compound (and/or ferrous ion) or a combination of a chlorate and a reducing sulfoxy compound is preferred.

Generally the amount of the catalyst is 0.5 – 5 % by weight based on the monomer(s) and the polymerization is conducted at a temperature of 0° –100° C., preferably 10° –80° C.

The thus-obtained halogen-containing polymer emulsion is mixed with the spinning solution. At this time the amount of the halogen-containing polymer in the emulsion should be 10 to 60 weight percent, preferably 20 to 50 weight percent. The use of an emulsion lower than this limit will give rise to gellation of the spinning solution. When the content of the halogen-containing polymer in the emulsion exceeds 60%, the polymer particles will aggregate in the step of the emulsion polymerization. The amount of the halogen-containing polymer to be introduced into the spinning solution should be 5 to 60% by weight, preferably 10 to 50 % by weight based on the total of the amount of the acrylonitrile polymer plus the amount of the halogen-containing polymer.

The introduction of too small an amount less than this limit of halogen-containing polymer will not give sufficient flame retardancy. Also, the introduction of a greater amount of the halogen-containing polymer will cause a difficulty in the formation of filaments and entail a loss of the excellent properties of acrylic synthetic fibers.

The polymers of acrylonitrile used in the present invention include polyacrylonitrile and copolymers composed of acrylonitrile and a compound copolymerizable therewith. Representative compounds that can copolymerize with acrylonitrile to produce acrylonitrile polymer products useful for the practice of the present invention are those having a single $CH_2=C<$ group. Examples of such compounds include vinyl esters, particularly vinyl esters of saturated aliphatic monovalent carboxylic acids, e.g. vinyl acetate, vinyl propionate, vinyl butyrate; vinyl halides and vinylidene halides, e.g. vinyl chloride, vinyl bromide, vinylidene chloride, vinylidene bromide, vinylidene fluoride; allyl-type alcohols, e.g. allyl alcohol, methallyl alcohol; allyl, methallyl and other unsaturated monohydric alcohol esters of monobasic acids, e.g. allyl and methallyl acetates, laurates, cyanides; acrylic acid and alkacrylic acid, e.g. methacrylic acid, ethacrylic acid, and esters and amides of such acids, e.g. methyl, ethyl, propyl butyl, etc. acrylates, methacrylates, acrylamide, methacrylamide, N-methyl, -ethyl, -propyl, -butyl, etc. acrylamides and methacrylamides; methacrylonitrile, ethacrylonitrile, and other hydrocarbon-substituted acrylonitriles; unsaturated sulfonic acids having a single $CH_2=C<$ group and salts thereof, e.g. allylsulfonic acid, methallylsulfonic acid, styrenesulfonic acid and sodium and potassium salts thereof; unsaturated aliphatic hydrocarbons having a single $CH_2=C<$ group, e.g. isoprene; and many other vinyl, acryl and other compounds having a single $CH_2=C<$ group, copolymerizable with acrylonitrile to produce thermoplastic copolymers. Allyl esters of α, β-unsaturated polycarboxylic acids, e.g. dimethyl, -ethyl, -propyl, -butyl, etc. esters of maleic acid, fumaric acid, citraconic acid, etc. equally copolymerize with acrylonitrile to form copolymers. In general, the molecular weight (average molecular weight) of acrylonitrile homopolymers of copolymers for producing shaped products of polyacrylonitrile should range from 25,000 or 30,000 to 200,000 or 300,000 or over, and preferably from 50,000 to 100,000 in particular. The molecule of the polymer desirably contains at least 60%, preferably more than 80% of combined acrylonitrile, but polymers containing a lesser amount of acrylonitrile are also useful for the practice of the present invention.

In the present invention, as the inorganic solvents for dissolving acrylonitrile polymers to form a spinning solution, any known inorganic solvent for acrylonitrile polymers may be used. For example, concentrated aqueous solutions of thiocyanates such as sodium thiocyanate, potassium thiocyanate, ammonium thiocyanate, calcium thiocyanate; concentrated aqueous solutions of chlorides such as zinc chloride, calcium chloride; and concentrated aqueous solutions of strong acids such as nitric acid, sulfuric acid may be recited. In addition, a mixed solvent containing another organic or inorganic compound may be used to improve the dissolving power of the inorganic solvents. Among various such inorganic solvents, when particularly an aqueous concentrated thiocyanate solution is used for preparing an acrylic spinning solution to form filaments, the contemplated objects of the present invention are achieved very advantageously.

As for the method for introducing the halogen-containing polymer emulsion into the spinning solution, any method may be used so far as a spinning solution consisting of the halogen-containing polymer emulsion, acrylonitrile polymer and inorganic solvent can be finally obtained.

The acrylonitrile polymer spinning solution in which the halogen-containing polymer emulsion has been thus dispersed uniformly is extruded in the usual way into a coagulating liquid to form filaments. The thus obtained acrylic gelfilaments containing the halogen-containing polymer are then subjected to the well-known post-treatments including water-rinsing, stretching, drying, heat-relaxing, etc. and are formed into acrylic synthetic filaments of the present invention having excellent properties.

The following example is given only for a better understanding of the present invention and not for limiting the invention. All percentages and parts in the example are by weight unless otherwise specified.

EXAMPLE 1

Methacrylic acid and sodium p-styrenesulfonate was mixed in the ratio of 70:30. To 100 parts of this monomer mixture, 2 parts of ammonium persulfate, 1.8 parts of sodium metabisulfite, 0.0015 part of ferrous chloride and 230 parts deionized water were added, and the resulting mixture was subjected to polymerization at 70° C. for 1 hour under stirring. The thus-obtained solution of the water-soluble polymer was directly dissolved in water and used in the subsequent emulsion polymerization.

The formulation used in the emulsion polymerization was as follows:

| Substances | Parts charged |
|---|---|
| Vinylidene chloride | 38 |
| Water-soluble polymer | 2 |
| Ammonium persulfate | 0.2 |
| Sodium metabisulfite | 0.18 |
| Ferrous chloride | 0.0006 |
| Deionized water | 60 |

The prescribed amounts of the water-soluble polymer and ferrous chloride were first dissolved in 55 parts of deionized water. This solution was fed to a polymerization vessel, and after the prescribed amount of vinylidene chloride was further fed, stirring was started. Solutions obtained by dissolving the ammonium persulfate and sodium metabisulfite in 2.5 parts of deionized water respectively were added dropwise respectively to the polymerization vessel, and then the polymerization was started. The speed of addition of these catalyst solutions was so controlled that the addition was completed in one hour. Since the pH of the polymerization system was below 3, no particular adjustment was made. The polymerization reaction was carried out at atmospheric pressure at 30° C. for 2 hours. The polymer emulsion obtained was observed under a microscope and was confirmed that any droplet of unreacted monomer did not remain.

Eleven parts of the thus-obtained polyvinylidene chloride emulsion of an average particle diameter of about 50 m$\mu$ and 16 parts of an acrylonitrile copolymer consisting of 88% acrylonitrile and 12% vinyl acetate were mixed, and further 8 parts of water and 65 parts of an aqueous 58 % solution of sodium thiocyanate were added. After stirring at 70° C. for 1 hour, an acrylic spinning solution in which polyvinylidene chloride particles were dispersed finely and uniformly was obtained, without causing foaming. In the spinning solution thus obtained, no formation of masses due to aggregation of polyvinylidene chloride particles occured, and the solution was very useful as a spinning solution for producing filaments.

The spinning solution was extruded into a coagulating bath of an aqueous 10% sodium thiocyanate solution at 0° C. to form filaments. The filaments, after being washed with water, were stretched 10 times the length, dried and then subjected to wet heat relaxing treatment at 115° C., with the result that an acrylic synthetic fiber having very good flame retardancy and excellent transparency was obtained.

In addition, any trouble such as filter clogging, spinnerette clogging or foaming in the coagulating bath which caused difficulties in operation did not occur in the fiber production step, and the acrylic synthetic fiber was obtained in a stable manner.

EXAMPLE 2

By the use of an autoclave the polymerization of vinyl chloride was conducted with the following formulation:

| Vinyl chloride | 40 parts |
|---|---|
| Water-soluble polymer of Example 1 | 2.0 parts |
| Ammonium persulfate | 0.2 part |
| Sodium bisulfite | 0.2 part |
| Ferrous chloride | 0.01 part |
| Deionized water | 60 parts |

The polymerization was conducted at 40° C. for 3 hours to obtain a low viscosity emulsion of polyvinyl chloride. The polymerization yield was 100%.

The thus obtained emulsion was introduced into and uniformly mixed with a spinning solution of acrylonitrile-methyl acrylate copolymer as dissolved in an aqueous solution of sodium thiocyanate in a manner as in Example 1. The resulting spinning solution was subjected to wet-spinning to obtain transparent acrylic fibers excellent in flame-retardancy. During the introduction of said emulsion into the polymer solution no foaming was observed and there was no aggregation of polyvinyl chloride particles. Further there was no such trouble as clogging of filter, clogging of spinning nozzles, foaming of coagulation bath during the spinning operation.

EXAMPLE 3

The polymerization of a 50/50 monomeric mixture of vinyl bromide/vinylidene chloride was conducted in the same manner as in Example 2 except that the polymerization was carried out for 4.5 hours, to obtained a low viscosity emulsion containing very fine particles of the polymer. The polymerization yield was more than 95%.

The thus obtained emulsion was introduced into an acrylic polymer solution in the same manner as in Example 1 and the resulting spinning solution was subjected to wet-spinning to obtain acrylic fibers with excellent transparency. During the operation no foaming was observed so that is was not necessary to employ a defoaming agent. Further the aggregation of emulsion particles was not observed.

What we claim is:

1. In a process for the production of a flame retardant acrylic synethic fiber by making a spinning solution composed of an inorganic solvent solution of an acrylonitrile polymer with an emulsion of a polymer of a vinyl halide and/or vinylidene halide, and wet spinning the resulting mixed solution, the improvement which comprises using, as said emulsion, an emulsion obtained by polymerizing a vinyl halide and/or vinylidene halide, or a mixture of such monomers with other unsaturated monomers copolymerizable therewith, in an aqueous medium below a pH of 4 using a water-soluble cataylst, in the presence of a water-soluble polymer containing copolymerized monomer units consisting essentially of an ethylenically unsaturated carboxylic acid or a salt thereof and monomer units consisting of an ethylenically unsaturated sulfonic acid or a salt thereof, the ratio of monomeric units of ethylenically unsaturated carboxylic acid or its salt to monomeric units of ethylenically unsaturated sulfonic acid or its salt being 30–80 : 70–20 in weight ratio.

2. A process as claimed in claim 1 wherein the said water-soluble polymer is present in the polymerization system in an amount of 0.5 –10 % by weight based on the monomer(s).

3. A process as claimed in claim 1 wherein the said water-soluble polymer is a copolymer of methacrylic acid and sodium p-styrenesulfonate.

4. A process as claimed in claim 1 wherein vinyl halide is vinyl chloride or vinyl bromide.

5. A process as claimed in claim 1 wherein vinylidene halide is vinylidene chloride.

6. A process as claimed in claim 1 wherein there is used an emulsion containing 10 – 60 % by weight of a polymer of vinyl halide and/or vinylidene halide.

7. A process as claimed in claim 1 wherein the polymer of vinyl halide and/or vinylidene halide is introduced into the spinning solution in an amount of 5 – 60 % by weight based on total of said polymer of vinyl halide and/or vinylidene halide and acrylonitrile polymer.

8. A process as claimed in claim 1 wherein the acrylonitrile polymer contains at least 60 % by weight of acrylonitrile.

9. A process as claimed in claim 1 wherein the inorganic solvent is a concentrated aqueous solution of thiocyanate.

* * * * *